(12) United States Patent
Scirbona et al.

(10) Patent No.: US 10,401,569 B2
(45) Date of Patent: Sep. 3, 2019

(54) SHEATH SPLITTER AND CUTTER

(71) Applicant: Kamran Emdadi, Virginia Beach, VA (US)

(72) Inventors: Edward Scirbona, Danbury, CT (US); Richard Gerszberg, Larchmont, NY (US)

(73) Assignee: JONARD TOOLS, Tuckahoe, NY (US)

( * ) Notice: Subject to any disclaimer, the term of this patent is extended or adjusted under 35 U.S.C. 154(b) by 80 days.

(21) Appl. No.: 15/821,351

(22) Filed: Nov. 22, 2017

(65) Prior Publication Data

US 2018/0095222 A1    Apr. 5, 2018

Related U.S. Application Data

(63) Continuation-in-part of application No. 15/016,551, filed on Feb. 5, 2016, now Pat. No. 9,819,161.

(51) Int. Cl.
| | | |
|---|---|---|
| *G02B 6/245* | (2006.01) | |
| *H02G 1/12* | (2006.01) | |
| *G02B 6/44* | (2006.01) | |

(52) U.S. Cl.
CPC .......... *G02B 6/245* (2013.01); *G02B 6/4497* (2013.01); *H02G 1/1217* (2013.01)

(58) Field of Classification Search
CPC ..... H02G 1/1217; G02B 6/245; G02B 6/4497
USPC ................................................. 30/90.4, 91.1
See application file for complete search history.

(56) References Cited

U.S. PATENT DOCUMENTS

| | | | | |
|---|---|---|---|---|
| 2,120,398 A * | 6/1938 | Edwards | ............ | H02G 1/1229 30/90.6 |
| 2,141,002 A * | 12/1938 | Huff | .................. | H02G 1/1231 30/90.7 |
| 2,627,768 A * | 2/1953 | Cook, Jr. | ............ | H02G 1/1217 30/91.1 |
| 3,151,510 A * | 10/1964 | Bunker | ............... | H02G 1/1295 30/90.6 |
| 4,587,731 A * | 5/1986 | Krampe | ............... | H02G 1/1224 30/90.1 |
| 4,799,406 A * | 1/1989 | Diaz-De-Guerenu-Aguirrebeitia | ....... | H02G 1/1224 30/90.1 |
| 4,905,373 A * | 3/1990 | Krampe | ............... | H02G 1/1229 30/90.6 |
| 4,947,549 A * | 8/1990 | Genovese | ............. | G02B 6/245 30/90.8 |
| 5,140,751 A * | 8/1992 | Faust | .................... | G02B 6/245 30/90.4 |
| 6,079,104 A * | 6/2000 | Krampe | ............... | H02G 1/1204 30/123 |
| 6,138,362 A * | 10/2000 | Yoshimori | .......... | H02G 1/1224 30/90.1 |
| 9,263,823 B2 * | 2/2016 | Oshita | ................ | H01R 13/5205 |
| 9,819,161 B2 * | 11/2017 | Scirbona | ............. | H02G 1/1217 |

(Continued)

*Primary Examiner* — Hwei-Siu C Payer
(74) *Attorney, Agent, or Firm* — Emdadi Patent; Kamran Emdadi (57) ABSTRACT

A fiber cable may be neatly and efficiently cut if the razor edge is held in a fixed position while the cable is pulled along a cutting channel. The cable may be first cut to remove the outer layer prior to cutting further layers. One example may have a double cable splitting device with two sets of channels that include razors in each of the channels which locks in to position to secure the cable and razor against the cable during a cutting procedure.

14 Claims, 9 Drawing Sheets

(56) References Cited

U.S. PATENT DOCUMENTS

| | | | |
|---|---|---|---|
| 2010/0307007 A1* | 12/2010 | Grosserichter | H02G 1/1217 30/90.6 |
| 2013/0133204 A1* | 5/2013 | McDannell | H02G 1/1217 30/90.8 |
| 2018/0095222 A1* | 4/2018 | Scirbona | G02B 6/4497 |

* cited by examiner

SHEATH SPLITTER AND CUTTER

CROSS-REFERENCE TO RELATED APPLICATION

This application is a continuation-in-part of earlier filed U.S. patent application Ser. No. 15/016,551, filed on Feb. 5, 2016, now U.S. Pat. No. 9,819,161 and entitled TUBE SPLITTER, the entire contents of which are hereby incorporated by reference.

TECHNICAL FIELD OF THE APPLICATION

This application relates to a stripping tool and more particularly to a multi-size cylindrical channel tube splitter with precision cutting edges for neat splitting of fiber cables.

BACKGROUND OF THE APPLICATION

Conventionally, stripping tools used for stripping tubes holding fiber communications media have been developed to provide a small incision or a cutaway portion of a cable without damaging the signal carrying medium inside such tubes. The level of precision and accuracy of the cutting may be optimized to avoid failed attempts to make an incision without destroying the communication carrying medium inside the tube.

SUMMARY OF THE APPLICATION

Embodiments of the present application may include an apparatus that includes at least one of a first portion providing a first half of a first set of a plurality of channels, a second portion providing a first half of a second set of a plurality of channels, and a third portion disposed between the first portion and the second portion providing a second half of the first set of the plurality of channels and a second half of the second set of the plurality of channels, and the first portion and the third portion are connected via a first rotating axis and are configured to rotate and lock into a first closed position to form the first set of the plurality of channels each of which comprises at least one razor edge, and the second portion and the third portion are connected via a second rotating axis and are configured to rotate and lock into a second closed position to form the second set of the plurality of channels each of which comprises at least one razor edge.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of an apparatus, and system configuration, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

The tube/cable slitting apparatus provides a plurality of groove channels designed to provide easy access to optical fibers contained in loose buffer tubes sized between 1.2 mm-3.3 mm in diameter. With six precision grooves, buffer tube slitting can be performed without damage to the fiber. The blades are replaceable by the blade inserts as stand-alone inserts in the cable slicing apparatus.

Figure 1:
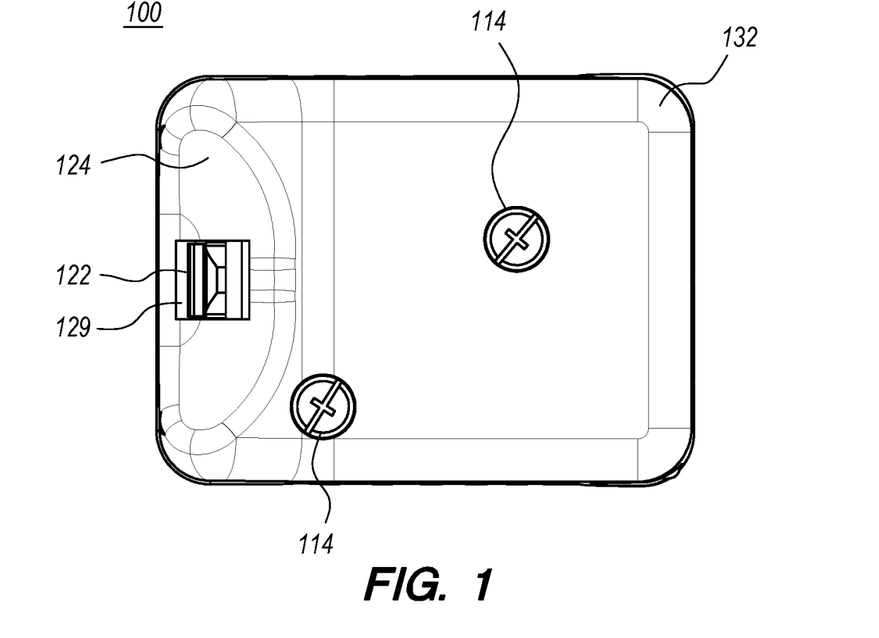
FIG. 1 illustrates an example top perspective hollow view of the structure of the cable splitter according to example embodiments.

FIG. 1 illustrates an example hollow top view of the structure of the cable splitter 100 according to example embodiments. Referring to FIG. 1, the body of the top portion 132 of the apparatus is illustrated as the exterior of the cable splitter which includes a set of screws 114 a depressed and curved finger accessible portion 124, and a lock tab 122 and slot configuration that passes through a cavity to lock the tab lip on a resting lip 129. The screws 114, are used to affix the razor channel inserts (see FIG. 3) into position inside the clam-shell like configuration of the cable splitter apparatus.

Figure 2:
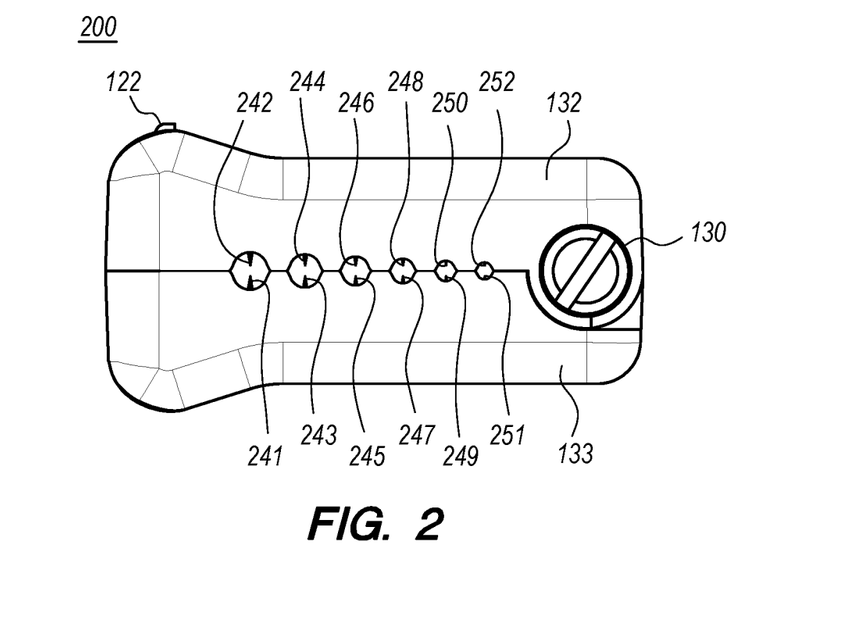
FIG. 2 illustrates example side view of the structure of the cable splitter according to example embodiments.

FIG. 2 illustrates example side view of the structure of the cable splitter 200 according to example embodiments. The side view illustrates the binding bolt 130 and screw configuration which holds the top 132 and bottom 133 portions of the clam-shell splitting configuration. The closed-position illustrates six channels with semi-cylindrical holes 141, 143, 145, 147, 149 and 151 each of which have different sized diameters including 2.9-3.3 mm, 2.5-2.9 mm, 2.1-2.5 mm, 1.8-2.1 mm, 1.5-1.8 mm, and 1.2-1.5 mm, respectively. Also, the cylindrical channels are formed with two separate razor edge pairs inside the channel including 241-251 on the bottom half and 242-252 on the top half. The first razor edge of each pair is provided from a first side of the clam-shell configuration and the second razor edge of the pair is provided from a second side of the clam-shell configuration. The razors from each half portion are aligned directly over one another as shown in FIG. 2.

Figure 3:
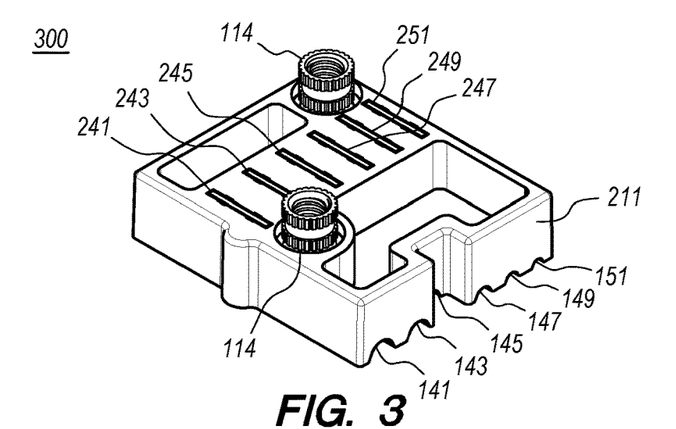
FIG. 3 illustrates an example rear view of one of the razor insert portions of the cable splitter according to example embodiments.

FIG. 3 illustrates an example rear view of one of the razor insert portions of the cable splitter according to example embodiments. Referring to FIG. 3, the insert illustration 300 includes the insert 211 face-down with two threaded insert channels which receive the bolts 114 which pass through the outer shell portion of the cable slicer and which are turned into the channel to affix the insert 211 to the clam-shell configuration. The bottom portions of the razors 241, 243, 245, 247, 249 and 251 are exposed as flat metal surfaces which are affixed to slots which receive the razors during manufacturing. The razors are exposed on the channel side of each channel, respectively, 141, 143, 145, 147, 149 and 151. The largest channel 141 has the largest razor 241, and the next largest channel 143 has the next largest razor 243, and so on, until the smallest channel 151 has the smallest razor 251. The relative sizes of the razor heights can be viewed from the example in FIG. 2. The razor channel 145 is slightly shorter than the other channels due to the cavity formed near the center of the razor insert 211.

Figure 4:
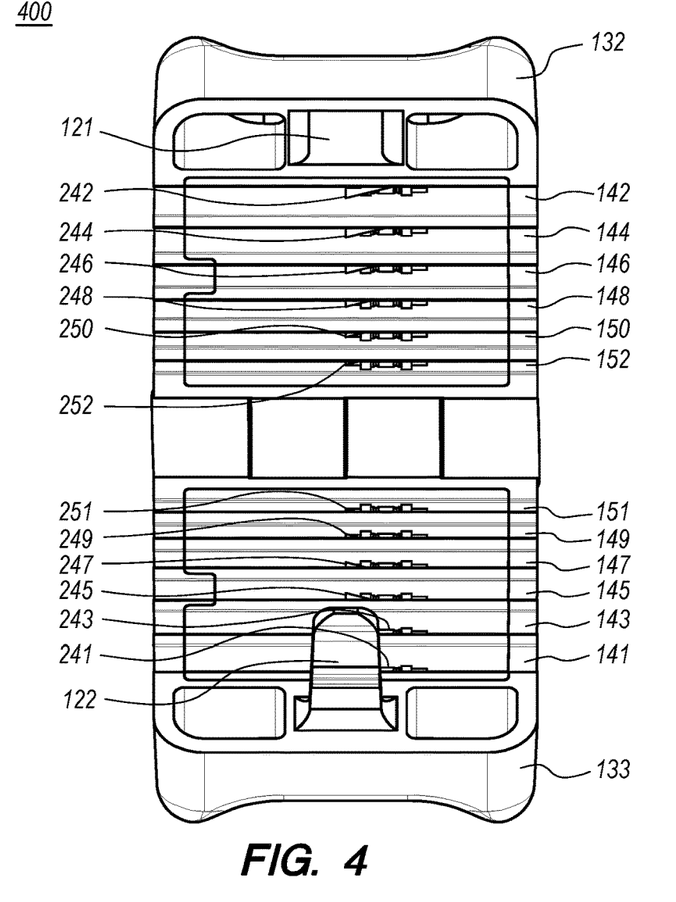
FIG. 4 illustrates a front view of the cable splitter in an open position with both razor inserts affixed to the cable splitter according to example embodiments.

FIG. 4 illustrates a front view of the cable splitter in an open position with both razor inserts affixed to the cable splitter according to example embodiments. Referring to FIG. 4, the open-faced clam-shell like configuration 400 includes both razor inserts 211 and 213 affixed to the body of the slicer to form a top and bottom portion of the slicer apparatus. The razors are each set on a right-side or right-half portion of the various channels including both the top channels 142, 144, 146, 148, 150 and 152 and the corresponding bottom channels 141, 143, 145, 147, 149 and 151. In a closed position, the razors on the top half 242, 244, 246, 248, 250 and 252 will be aligned directly over the bottom half razors 241, 243, 245, 247, 249 and 251, inside the cylindrical channels. Also, the tips of the razors are aligned to directly adjacent and over one another to create a maximum cutting distance that can be used to cut into the cables inserted into the channels during a use operation. Also, the tab 122 may pass directly through the hole 121 when the top portion 132 is pressed against the bottom portion 133 in a closed position.

Figure 5A:
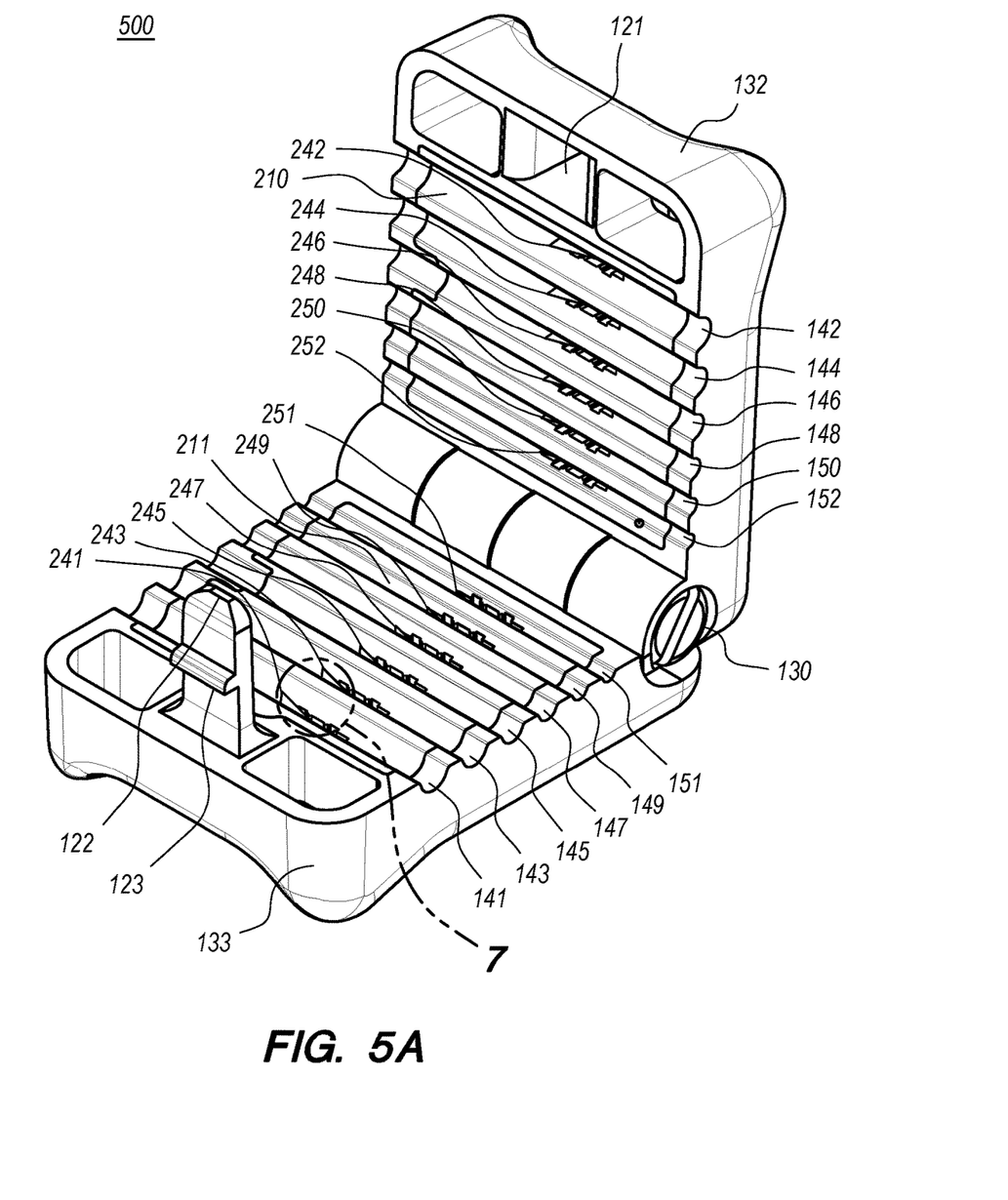
FIG. 5A illustrates a sideways perspective of the cable splitter in an open position with both razor inserts affixed to the cable splitter according to example embodiments.

FIG. 5A illustrates a sideways perspective of the cable splitter 500 in an open position with both inserts affixed to the cable splitter according to example embodiments. For all drawings, like reference numerals refer to like elements throughout. Referring to FIG. 5A, the two razor inserts 211 and 210 are illustrated as being affixed to the inner layer of the slicer apparatus. As may be observed, the razors are in the same position on each channel and are all disposed on one half of the channel length while the other half is empty and has no razors. The peaks of the razor edges are closer to the center of each channel for each individual channel. The closing tab 122 has a lip 123 for securing to a lip resting surface inside the passage 121 of the top portion of the device configuration.

Figure 5B:
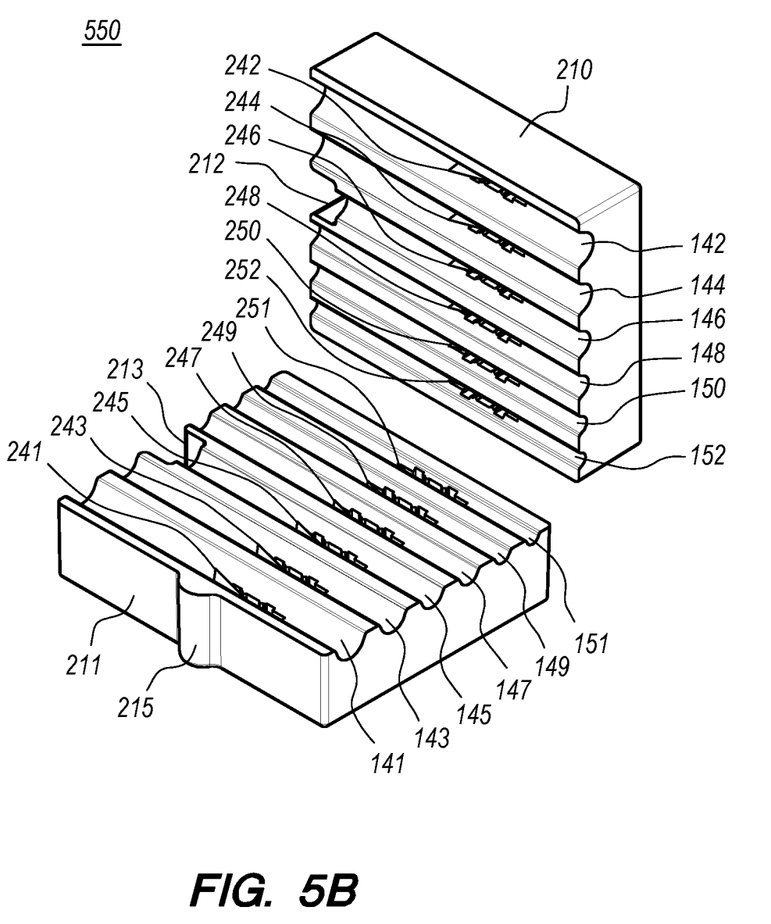
FIG. 5B illustrates a sideways perspective of the razor inserts according to example embodiments.

FIG. 5B illustrates a sideways perspective of the inserts alone 550 according to example embodiments. Referring to FIG. 5B, the two inserts 210 and 211 each have a curved depression 212 and 213 for form-fitting inside a body of the cable splitter device. The bottom portion may also have a curved protrusion 215 while the top portion may be flat on its topmost edge.

Figures 6, 7:
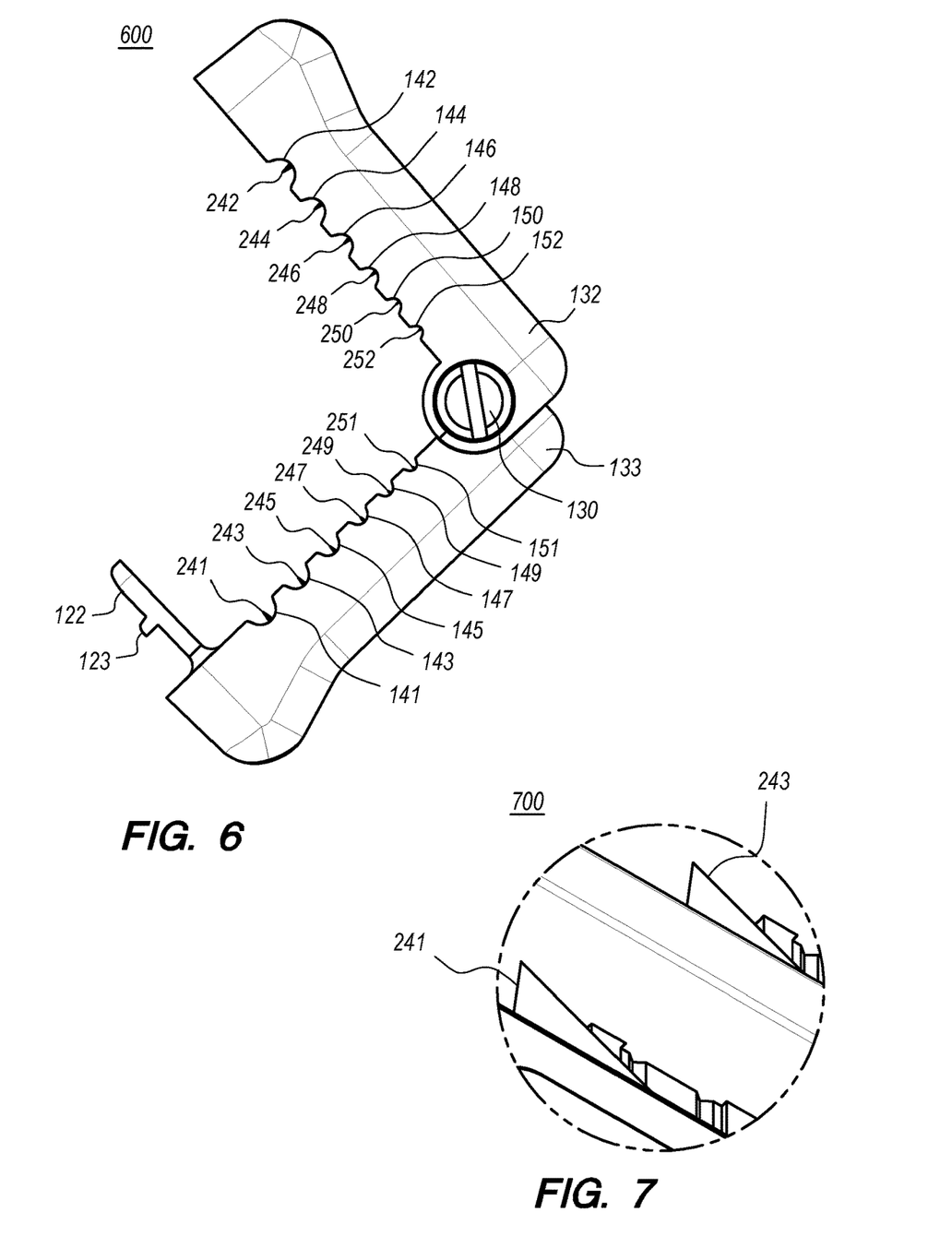
FIG. 6 illustrates a sideways perspective of the cable splitter in an open position with both razor inserts affixed to the cable splitter according to example embodiments.
FIG. 7 illustrates a scaled view of some of the blades of the razor insert of the cable splitter according to example embodiments.

FIG. 6 illustrates a sideways perspective of the cable splitter in an open position with both inserts affixed to the cable splitter according to example embodiments. Referring to FIG. 6, the illustration 600 includes all six channels formed by the grooves on both sides of the clam-shell halves 132 and 133. In alternative embodiments, the razors may only appear on one channel half and not the other, and the number of channels may be 2, 4, 5, 6, 7, 8, 10 or more.

FIG. 7 illustrates a scaled view of two of the blades of the insert 211 of the cable splitter according to example embodiments. Referring to the example in FIG. 7, a razor edge 141 has a peak portion and a declining sloped-edge. The razor is embedded in the body of the channel via a hole carved into the channel. Razor 241 is larger than the next channel razor 243 as shown in the blown-up perspective of the razors. The embodiments described may be plastic, metal, or a polycarbon/poly-plastic material.

In operation, the user may select the correct groove size. Each groove is marked with the recommended fiber size. The fiber can then be placed in the groove to be used. The arrow on the top of the body indicates a blade location and a pulling direction to split the cable. Next, the device may be closed in a closing clam-shell configuration and locked to permit a user to pull the cable to the desired slit length.

Figure 8:
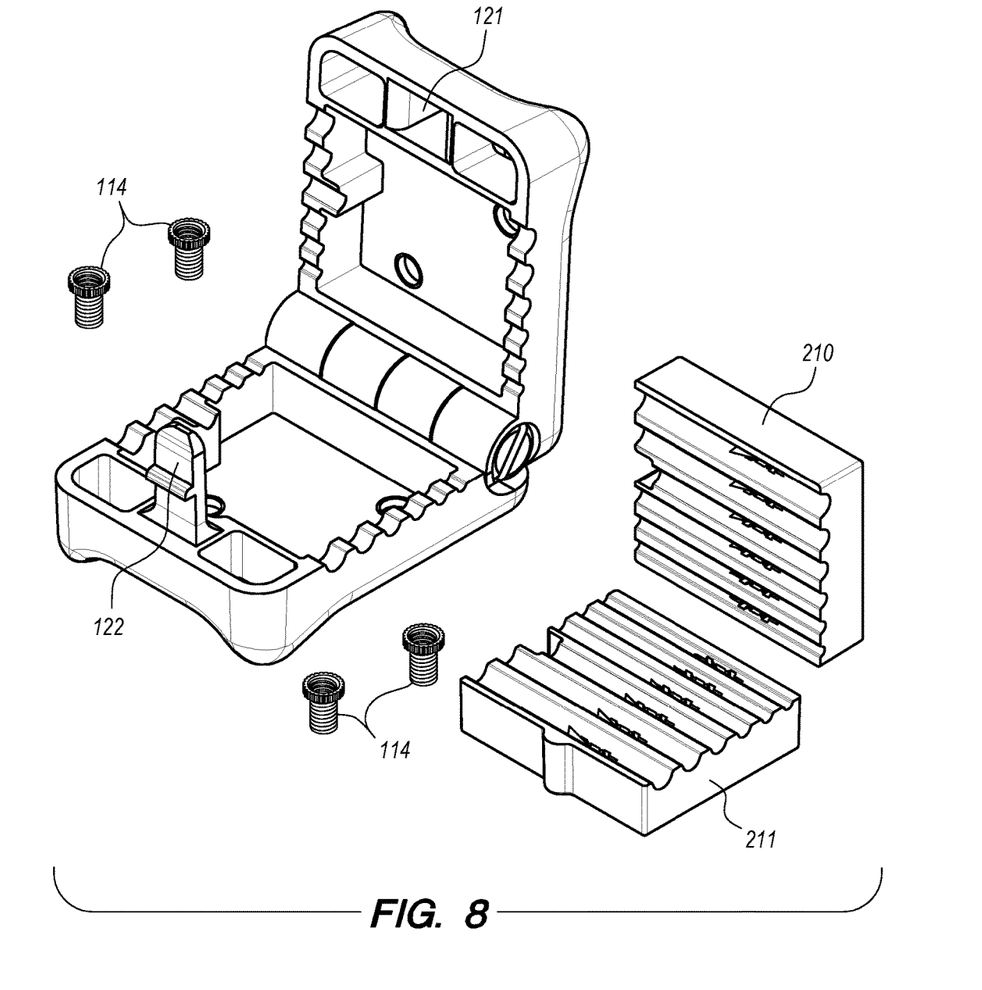
FIG. 8 illustrates an exploded view of the cable splitter according to example embodiments.

FIG. 8 illustrates an exploded view of the cable splitter according to example embodiments. Referring to FIG. 8, the top and bottom halves of the open configuration of the cable splitter illustrate two holes in the exterior surfaces and two screw pairs 114 which enter those holes to secure the top and bottom portions of razor insert tracks 211 and 210.

One example embodiment may include the tube splitter device having a top portion 132 providing a first half of a plurality of channels 142-152 and a bottom portion providing a second half of the plurality of channels 141-151. The top portion and the bottom portion are connected via a rotating axis 130 and are configured to rotate and lock into a closed position to form a plurality of channels each of which has at least one razor blade edge 241-251 and/or 242-252. The top portion includes a first removable razor insert track 210 with provides a majority length of the first half of the plurality of channels and at least one razor edge in each of the plurality of channels. As may be observed, the channels extend before and after the insert is in-place, however, the majority of the length of the channels is provided by the insert 210. Also, the bottom portion includes a second removable razor insert track 211 which also provides a majority length of the second half of the plurality of channels and at least one razor edge in each of the plurality of channels.

The top portion further includes a hole 121 with a resting lip edge and the bottom portion further includes a tab 122 with a lip 123 extending upward or perpendicular to a planar surface of the bottom portion 133, and when the top portion and the bottom portion are in a closed position the tab extends beyond a planar surface of the top portion and maintains a locked position via the lip resting against the resting lip edge as shown in FIG. 2. The top portion further includes at least one hole permitting at least one screw to pass through the hole and secure the first removable razor insert track to the top portion as illustrated in FIG. 8. In that example, there are actually two holes in each of the top and bottom portions, however, one, two or more holes may be used in alternative embodiments. The bottom portion further includes at least one hole permitting at least one screw to pass through the hole and secure the second removable razor insert track to the bottom portion. In a closed position the top portion includes at least one razor edge disposed in each of the plurality of channels positioned directly opposite at least one additional razor edge disposed in each of the plurality of channels extending from the bottom portion (See FIG. 5A). In alternative examples, the plurality of channels includes 2, 4, 6, 8, 10 or 12, 6 was merely an example number of channels. The plurality of channels are cylindrical-shaped channels.

In a closed position, the bottom half and the top half form a cylindrical channel with protruding razor edges on the top and the bottom of each of the plurality of channels, and the razor edges are directly opposite one another and disposed on one half side of the plurality of cylindrical channels (the right side of the channel).

In one example embodiment, a single clam-shell configuration may provide a top portion providing a first half of a plurality of cylindrical channels, the top portion may have a first removable razor insert track which represents a majority length of the first half of the plurality of cylindrical channels, and the first removable razor insert track may rest flush mounted to a portion of a length of the first half of the plurality of cylindrical channels not provided by the first removable razor insert, and a bottom portion may provide a second half of the plurality of cylindrical channels, the bottom portion may include a second removable razor insert track that includes a majority length of the second half of the plurality of cylindrical channels, and the additional removable razor insert track rests flush mounted to a portion of a length of the second half of the plurality of cylindrical channels not provided by the second removable razor insert, and the top portion and the bottom portion are connected via a rotating axis and are configured to rotate and lock into a closed position, via a tab disposed on the bottom portion and which protrudes through a hole in the top portion, and the closed position forms a plurality of complete cylindrical channels each of which comprises at least one razor blade edge, and the at least one razor blade edge in each of the plurality of complete cylindrical channels is a different size than each of the at least one razor blade edge in each of the other complete cylindrical channels.

Figure 9:
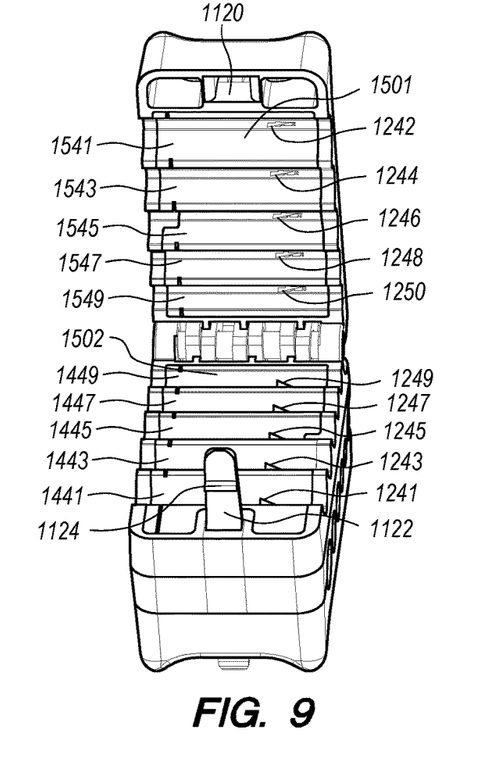
FIG. 9 illustrates a front view of the double cable splitter with a first of two sides open and the second side shut according to example embodiments.

According to additional embodiments, a double tube splitter device may include two "clam shells" which share a common top portion which provides locking mechanisms for both sides of the double clam-shell. One half of the double tube splitter may be similar to the example embodiment illustrated in FIGS. 1-9. For example, there may be a set of razors inserted in a parallel alignment to the channels with removable razor inserts in both the top portion and the bottom portion of the first clam-shell side, as illustrated in FIG. 9. However, there may be a different type of razor configuration in the second clam-shell side, for instance, the razors may be disposed perpendicular to the length of the channels as illustrated in FIG. 10.

FIG. 9 illustrates a front view of the double cable splitter with a first of two sides open and the second side shut according to example embodiments. Referring to FIG. 9, the first half of the sheath splitter and cutter, also referred to as a 'double clam-shell device' includes the top razor insert 1501 with channels 1541, 1543, 1545, 1547 and 1549, which are semi-cylindrical and form a cylinder with the bottom half of the first half of the double clam-shell device. Each of the channels has respective razors 1242, 1244, 1246, 1248 and 1250, protruding upward, on one half side of each of the channels. Similarly, in the bottom half of the first half of the double clam-shell device, the razor insert 1502 includes a plurality of channels 1441, 1443, 1445, 1447 and 1449, each of which forms a cylinder channel when in a closed position with the top portion of the first half of the double clam-shell device. Those channels also have respective razors 1241, 1243, 1245, 1247 and 1249. The locking mechanism includes a tab 1122 protruding upward with respect to the bottom half and includes a lip 1124 to lock against a lip resting surface inside the passage hole 1120.

Figure 10:
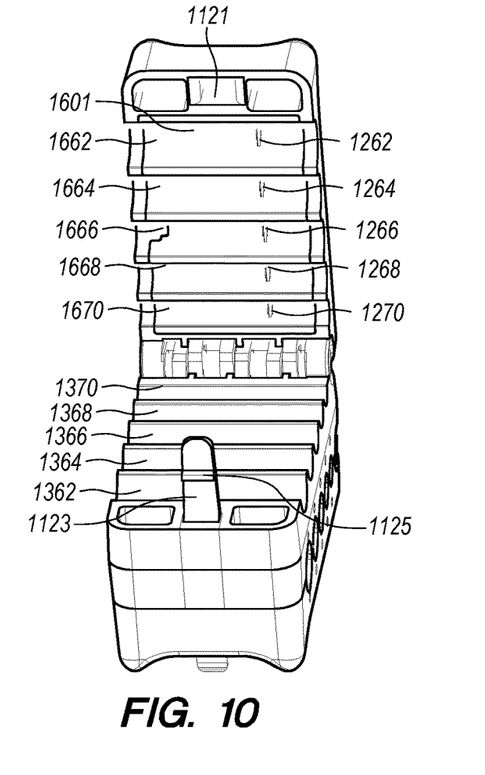
FIG. 10 illustrates a front view of the double cable splitter with the second of the two sides open and the first side shut according to example embodiments.

FIG. 10 illustrates a front view of the sheath and cutter device with the second of the two sides open and the first side shut according to example embodiments. Referring to FIG. 10, the configuration of the second half of the double clam-shell device is different from the first half. For example, in the razor insert 1601, there are channels 1662, 1664, 1666, 1668 and 1670, and respective razors 1262, 1264, 1266, 1268 and 1270. However, those razors are substantially flat unlike the razors in the first half of the double clam-shell which come to a point and slope downward. The razors 1262-1270 are also disposed perpendicular in length to the length of the channel in which they are disposed. Another difference in the second half of the double clam-shell is the channels 1370, 1368, 1366, 1364 and 1362, in the bottom half of the second half of the double clam-shell, where there are no razors, but those channels still form a cylindrical channel when the top half and the bottom half are in a closed position, as demonstrated in the example of FIG. 11. The second half may also be firmly locked when the protruding locking tab 1123 passes through the passage hole 1121 and the lip 1125 rests against the lip resting surface.

In operation, a cable may be laid into the channel of the second half of the combination sheath splitter and cutter, which may then be closed and rotated about the cable to provide a neat and fixed depth incision into the cable sheathing. The device can then be removed and re-located to another part of the cable, and the device can be closed and rotated again to provide a second fixed depth incision. The second side can be removed from the cable, and the cable can be laid into the channel of the first side where the combination sheath splitter and cutter can be pulled from one incision to the second incision splitting the sheathing. The sheathing may then be removed to expose the inside of the cable.

Figure 11:
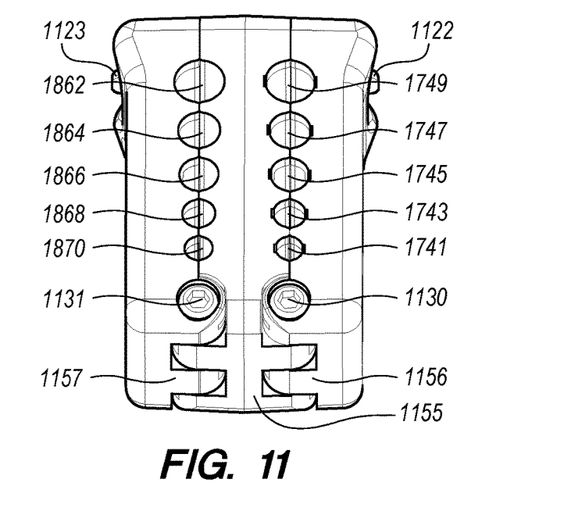
FIG. 11 illustrates a rear-angled side view of the double cable splitter with both sides in a closed positing according to example embodiments.

FIG. 11 illustrates a rear-angled side view of the double cable splitter with both sides in a closed positing according to example embodiments. In this example, the double clam-shell is in a double locked position. The top-most portions of the locking tabs are exposed 1123 and 1122 and the cylindrical channels are also observable from this perspective. The channels for the second half of the double clam-shell include 1862, 1864, 1866, 1868 and 1870. The screw 1131 provides a pivot point for the interweaved structure 1155 of the center column, which pairs with the interweaved structure 1157 of the second half of the double clam-shell and the interweaved structure 1156 of the first half of the double clam-shell. On the second side of the device are the cylindrical channels 1741, 1743, 1745, 1747 and 1749 formed by a closed position of the device. The screw 1130 provides a pivot point around which the interweaved structure 1155 of the center column may rotate, and which pairs with the interweaved structure 1156 of the first half of the double clam-shell.

Figure 12:
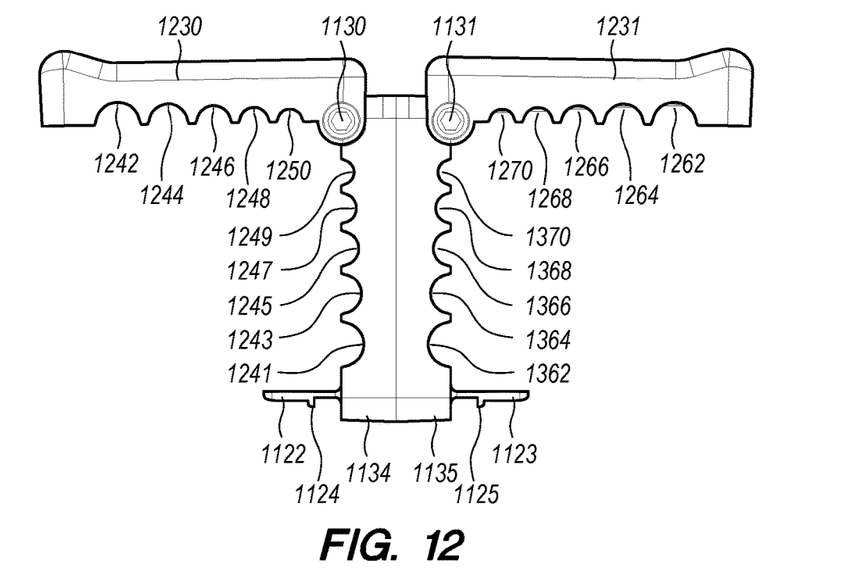
FIG. 12 illustrates a side view of the double cable splitter with both sides in an open position according to example embodiments.

FIG. 12 illustrates a side view of the double cable splitter with both sides in an open position according to example embodiments. Referring to FIG. 12, the double open configuration includes the first and second sides of the double clam-shell tube splitter device in a fully-open position. The top portions 1230 and 1231 are open to a position of 90 degrees with respect to the center column, which has a first half 1134 and a second half 1135, which are affixed to one another. The end of the center column has tabs 1122 and 1123 having respective lips 1124 and 1125. In operation, only one side would be opened at a time for effective operation.

Figure 13:
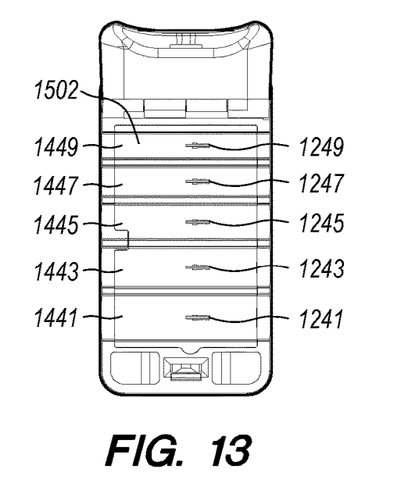
FIG. 13 illustrates a top view of the double cable splitter with the first side in an open position according to example embodiments.

FIG. 13 illustrates a top view of the double cable splitter with the first side in an open position according to example embodiments. Referring to FIG. 13, top-down view illustrates the bottom razor insert 1502 with its respective channels and razors.

Figure 14:
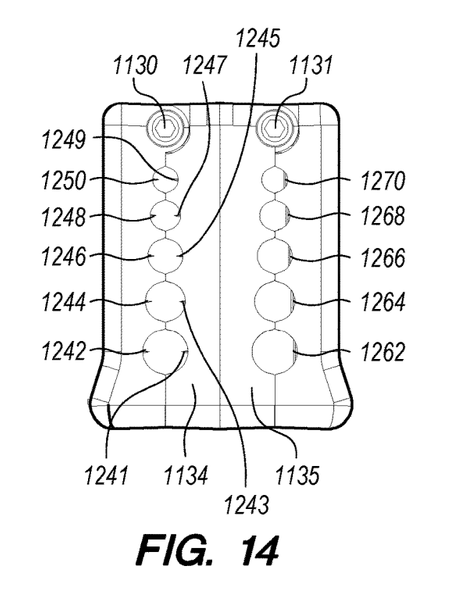
FIG. 14 illustrates a side view of the double cable splitter with both sides in a closed positing according to example embodiments.

FIG. 14 illustrates a side view of the double cable splitter with both sides in a closed positing according to example embodiments. In this perspective, the screws 1130 and 1131 are visible along with razor points on each side of the cylindrical channel, including 1249, 1250 in the smallest channel, 1248 and 1247 in the next largest sized channel, 1248 and 1247 in the next largest sized channel, 1246 and 1245 in the next largest sized channel, 1244 and 1243 in the next largest sized channel and 1242 and 1241 in the next largest sized channel. As may be observed, the other channels only have a single razor edge in each channel on the right-most side, including 1270, 1268, 1266, 1264, and 1262.

Figure 15:
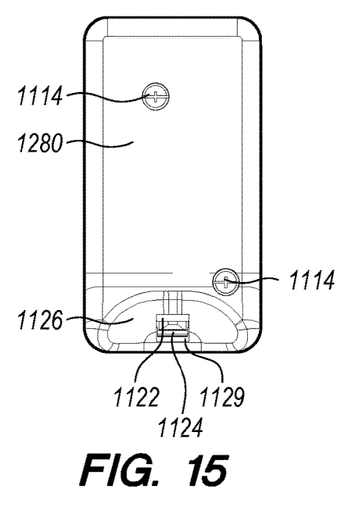
FIG. 15 illustrates a top view of the first side of the double cable splitter in a closed position according to example embodiments.

FIG. 15 illustrates a top view of the first side of the double cable splitter in a closed position according to example embodiments. In this example, the screws 1114 hold the razor insert tracks into the body of the double tube splitter device. The planar surface 1280 represents the top of the half double clam-shell and the sloped surface 1126 slopes inward permitting a user's finger to easily engage the tab 1122 to lock/unlock the device half via a lip 1124 against a lip resting surface 1129.

Figure 16:
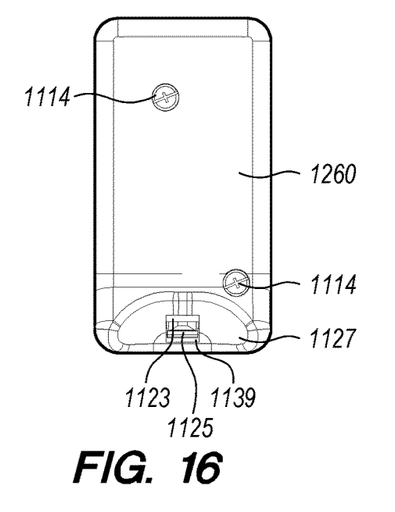
FIG. 16 illustrates a top view of the second side of the double cable splitter in a closed position according to example embodiments.

FIG. 16 illustrates a top view of the second side of the double cable splitter in a closed position according to example embodiments. In this example, the screws 1114 hold the razor insert tracks into the body of the double tube splitter device. The planar surface 1260 represents the top of the other half of the double clam-shell and the sloped surface 1127 slopes inward permitting a user's finger to easily engage the tab 1123 to lock/unlock the device half via a lip 1125 against a lip resting surface 1139. The tabs may be easily bent via a flexible plastic material which is the same or similar to the plastic material used throughout the device body except for the razors, which are metal or a polycomposite plastic that is sufficiently hard to permit a sharp edge to be formed during fabrication.

In one example, a first portion, such as 1230 of FIG. 12 may provide a first half of a first set of a plurality of channels, and a second portion, such as 1231, may provide a first half of a second set of a plurality of channels, and a third portion, such as the center column (both halves 1134/1135) may be disposed between the first portion and the second portion providing a second half of the first set of the plurality of channels and a second half of the second set of the plurality of channels, and the first portion and the third portion are connected via a first rotating axis 1130 and are configured to rotate and lock into a first closed position to form the first set of the plurality of channels each of which comprises at least one razor edge, and the second portion and the third portion are connected via a second rotating axis 1131 and are configured to rotate and lock into a second closed position to form the second set of the plurality of channels each of which comprises at least one razor edge. The sizes of the channels may vary along with the number of channels. However, in one preferred embodiment the sizes of the channels may be, in millimeters, 5.0 to 5.6, 6.0 to 6.6, 7.2 to 7.8, 7.8 to 8.4 and 8.4 to 11 mm.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

What is claimed is:

1. An apparatus comprising:
    a first portion providing a first half of a first set of a plurality of channels;
    a second portion providing a first half of a second set of a plurality of channels; and
    a third portion disposed between the first portion and the second portion providing a second half of the first set of the plurality of channels and a second half of the second set of the plurality of channels, and
    wherein the first portion and the third portion are connected via a first rotating axis and are configured to rotate and lock into a first closed position to form the first set of the plurality of channels each of which comprises at least one razor edge, and
    wherein the second portion and the third portion are connected via a second rotating axis and are configured to rotate and lock into a second closed position to form the second set of the plurality of channels each of which comprises at least one razor edge.

2. The apparatus of claim 1, wherein the first portion comprises a first removable razor insert track comprising a majority length of the first half of the first set of the plurality of channels and the at least one razor edge in each of the first set of the plurality of channels.

3. The apparatus of claim 2, wherein the second portion comprises a second removable razor insert track comprising a majority length of the second half of the second set of the plurality of channels and the at least one razor edge in each of the second set of the plurality of channels.

4. The apparatus of claim 3, wherein the at least one razor edge in each of the second set of the plurality of channels is disposed perpendicular to a length of the second set of the plurality of channels.

5. The apparatus of claim 2, wherein the at least one razor edge in each of the first set of the plurality of channels is disposed parallel to a length of the second set of the plurality of channels.

6. The apparatus of claim 1, wherein the first portion further comprises a first hole with a first resting lip edge and the third portion further comprises a first tab with a first lip extending perpendicular to a planar surface of the first portion, and wherein when the third portion and the first portion are in a closed position, the first tab extends beyond the planar surface of the first portion and maintains a locked position via the first lip resting against the first resting lip edge.

7. The apparatus of claim 6, wherein the second portion further comprises a second hole with a second resting lip edge and the third portion further comprises a second tab with a second lip extending perpendicular to a planar surface of the second portion, and wherein when the third portion and the second portion are in a closed position the second tab extends beyond the planar surface of the second portion and maintains a locked position via the second lip resting against the second resting lip edge.

8. The apparatus of claim 2, wherein the first portion further comprises at least one hole permitting at least one screw to pass through the hole and secure the first removable razor insert track to the first portion.

9. The apparatus of claim 3, wherein the second portion further comprises at least one hole permitting at least one screw to pass through the hole and secure the second removable razor insert track to the second portion.

10. The apparatus of claim 1, wherein the first set of the plurality of channels comprises a number of channels selected from the group consisting of 2, 4, 5, 6, 8, 10 and 12.

11. The apparatus of claim 1, wherein the second set of the plurality of channels comprises a same number of channels as the first set of the plurality of channels.

12. The apparatus of claim 1, wherein the first set of the plurality of channels comprises two razors per channel.

13. The apparatus of claim 1, wherein the second set of the plurality of channels comprises one razor per channel.

14. The apparatus of claim 1, wherein at least one of the first set of plurality of channels and the second set of the plurality of channels are cylindrical channels.

* * * * *